United States Patent
Dixit et al.

(10) Patent No.: US 12,015,315 B2
(45) Date of Patent: Jun. 18, 2024

(54) INTEGRATED STARTER GENERATOR SYSTEM

(71) Applicant: SEDEMAC MECHATRONICS PVT LTD, Mumbai (IN)

(72) Inventors: Amit Dixit, Pune (IN); Anaykumar Joshi, Nagpur (IN)

(73) Assignee: SEDEMAC MECHATRONICS PVT LTD, Mumbai (IN)

( * ) Notice: Subject to any disclaimer, the term of this patent is extended or adjusted under 35 U.S.C. 154(b) by 17 days.

(21) Appl. No.: 17/928,410

(22) PCT Filed: May 28, 2021

(86) PCT No.: PCT/IN2021/050522
§ 371 (c)(1),
(2) Date: Nov. 29, 2022

(87) PCT Pub. No.: WO2021/240550
PCT Pub. Date: Dec. 2, 2021

(65) Prior Publication Data
US 2023/0204006 A1 Jun. 29, 2023

(30) Foreign Application Priority Data
May 29, 2020 (IN) .............................. 202021022575

(51) Int. Cl.
*H02K 21/22* (2006.01)
*F02N 11/04* (2006.01)
(Continued)

(52) U.S. Cl.
CPC ............. *H02K 21/22* (2013.01); *F02N 11/04* (2013.01); *H01R 4/625* (2013.01); *H02K 3/14* (2013.01);
(Continued)

(58) Field of Classification Search
CPC ...... H02K 21/22; H02K 3/14; H02K 11/0094; H02K 2213/03
See application file for complete search history.

(56) References Cited

U.S. PATENT DOCUMENTS 4,286,180 A 8/1981 Langley
5,514,923 A * 5/1996 Gossler .................... H02K 7/02
310/68 B (Continued)

OTHER PUBLICATIONS

ISA/US "International Search Report for PCT/IN2021/050522", US, Sep. 27, 2021.

*Primary Examiner* — Pedro J Cuevas
(74) *Attorney, Agent, or Firm* — Locke Lord LLP; Tim Tingkang Xia, Esq.

(57) ABSTRACT

An Integrated Starter Generator system (100) comprising a battery (110) and a three-phase brushless DC electric machine (130). The electric machine (130) has a stator (132) with 3n stator teeth (132'), 'n' being a natural number, and each stator tooth (132') has a coil corresponding to one of the three phases. The electric machine (130) further has a rotor (134) with 4n rotor poles (134') facing the stator (132), and magnets on the rotor poles (134') are disposed with an alternating sequence of magnet polarity facing the stator (132). Herein, back-emf constant of the electric machine (130) is substantially between 25% of a nominal battery voltage and 75% of the nominal battery voltage.

6 Claims, 9 Drawing Sheets

(51) Int. Cl.
  *H01R 4/62* (2006.01)
  *H02K 3/14* (2006.01)
  *H02K 7/18* (2006.01)
  *H02K 11/00* (2016.01)
(52) U.S. Cl.
  CPC ....... *H02K 7/1815* (2013.01); *H02K 11/0094* (2013.01)

(56) References Cited

U.S. PATENT DOCUMENTS

| | | | |
|---|---|---|---|
| 10,958,201 B2* | 3/2021 | Lan | B64D 31/00 |
| 2006/0066172 A1 | 3/2006 | Takeuchi | |
| 2006/0097599 A1 | 5/2006 | Takeuchi | |
| 2007/0026093 A1* | 2/2007 | Coates | H02J 7/32 425/97 |
| 2019/0207543 A1* | 7/2019 | Lan | H02P 27/12 |
| 2023/0208263 A1* | 6/2023 | Dixit | H02K 21/22 290/46 |
| 2023/0283210 A1* | 9/2023 | Price | H02P 6/085 318/400.34 |

* cited by examiner

130

INTEGRATED STARTER GENERATOR SYSTEM

FIELD OF THE INVENTION

The present invention relates to an Integrated Starter Generator system.

BACKGROUND OF THE INVENTION

Conventional ISG systems comprise a three-phase brushless direct-current (BLDC) machine coupled to an engine crankshaft. The BLDC machine satisfies two purposes—to start the engine by rotating engine crankshaft to sufficiently high speeds to enable self-sustaining combustion, and to act as an alternator once the engine starts.

An electronic control unit (ECU) is typically coupled to the battery and to the BLDC machine. One of the primary purposes of the ECU is to apply optimal commutations to the BLDC machine to generate positive torque during engine starting, and to generate negative torque once the engine has started. The ECU typically comprises a three-phase H-Bridge circuitry to achieve the above. The ECU typically uses either 6-step commutation, sinusoidal commutation or space vector PWM to actuate the three-phase H-Bridge to produce required torque. Furthermore, typical ISG systems also comprise position sensors such as hall-effect sensors, to detect the relative position of rotor with respect to stator, and provide the sensed position to the ECU to perform optimal commutation, the position sensors and ECU typically connected using a wiring harness. Position sensors and the related wiring harness are prone to failure because of high temperature, vibration, and proximity to mechanical objects rotating at high speeds, therefore presenting a need for sensor-less operation of the BLDC machine. However, BLDC machines used in conventional ISG systems are not necessarily favourable to be used in sensor-less ISG systems.

While acting as a motor to start the engine, the BLDC machine is required to generate sufficiently high torque to make speed of engine crankshaft reach a threshold, wherein self-sustaining combustion of engine can sustain with high probability. The said threshold is typically higher when ambient temperature is substantially lower than room temperature, because of increase in viscosity of oil lubricating the engine. Furthermore, the said threshold is typically higher when the engine has not been started for a substantial amount of time. BLDC machines with high back-emf voltage per unit RPM, pose a challenge to generate high amount of torque as speed of engine crankshaft increases. As speed of engine crankshaft increases, the difference between battery voltage and back-emf voltage reduces, hence limiting the amount of current that can be provided to the machine. This limit in current correspondingly reduces the torque producing ability of machine, hence adversely affecting engine starting function.

While acting as an alternator, the speed of the BLDC machine reaches substantially high rotations per minute, resulting in large value of back-emf voltage being induced in the stator windings of the BLDC machine, the value of back-emf induced being substantially larger than the nominal voltage of battery. Because of the large value of back-emf induced compared to the nominal voltage of battery, the battery terminals appear as a short-circuit as perceived by the BLDC machine. Therefore, the amount of current flowing through the machine lines are approximately equal to the short-circuit current of the BLDC machine. The short circuit current of the BLDC machine is defined as the amount of current flowing through the machine lines if the motor line terminals are shorted, and the BLDC machine is rotated at high speeds. The short-circuit current typically increases with speed and eventually saturates. While acting as an alternator, the BLDC machine line current also flows through the power switches of the ECU. The line currents result in heat generation in stator winding of the BLDC machine because of resistance of stator winding, as well as result in heat generation inside the ECU because of the resistance of power switches. Therefore, it is preferable to reduce the amount of short circuit current of the machine to improve system efficiency.

BLDC machines used in conventional ISG systems comprises a stator and a rotor. The number of stator teeth and magnets are typically 3n and 2n respectively where n is a positive natural number. The stator is disposed with 3 sets of windings resulting in three phases, each phase being typically 120 electrical degrees apart from the other. Furthermore, for traditional ISG systems, BLDC machines are typically chosen such that they have line-to-line back-emf voltage amplitude to be greater than 75% of the nominal battery voltage, when the machine is rotated at 1000 RPM. It is perceived that BLDC machines with high back-emf voltage per unit RPM are well suited for ISG application. BLDC machine as described above has low value of stator winding inductance, hence resulting in large value of short circuit current. Furthermore, the high back-emf value of the BLDC machine adversely affects the engine starting function of the BLDC machine as discussed previously.

Thus, there is a need in the art for an Integrated Starter Generator system which addresses at least the aforementioned problems.

SUMMARY OF THE INVENTION

In one aspect of the invention, the present invention is directed at an Integrated Starter Generator system having a battery and a three-phase brushless DC electric machine. The electric machine has a stator with 3n stator teeth, 'n' being a natural number, and each stator tooth has a coil corresponding to one of the three phases. The electric machine further has a rotor with 4n rotor poles facing the stator, magnets on the rotor poles being disposed with an alternating sequence of magnet polarity facing the stator. Herein, back-emf constant of the electric machine, is substantially between 25% of a nominal battery voltage and 75% of the nominal battery voltage.

In an embodiment of the invention, average width of each stator teeth is smaller than 1.2 times the diameter of the stator divided by number of stator teeth.

In another embodiment of the invention, each stator tooth has a coil corresponding to one of the three phases wound in a same directional sense, wherein the teeth numbered 3k+1 are wound with the coil corresponding to a first phase, teeth numbered 3k+2 are wound with the coil corresponding to a second phase and teeth numbered 3k+3 are wound with the coil corresponding to a third phase, where $k \in [0, n-1]$.

In a further embodiment of the invention, the battery has the nominal battery voltage between 10 v and 14V.

In a further embodiment of the invention, n=3 with the stator having 9 stator teeth and the rotor having 12 rotor poles facing the stator.

In a further embodiment of the invention, n=5 with the stator having 15 stator teeth and the rotor having 20 rotor poles facing the stator.

In a further embodiment of the invention, n=4 with the stator having 12 stator teeth and the rotor having 16 rotor poles facing the stator.

BRIEF DESCRIPTION OF THE DRAWINGS

Reference will be made to embodiments of the invention, examples of which may be illustrated in accompanying figures. These figures are intended to be illustrative, not limiting. Although the invention is generally described in context of these embodiments, it should be understood that it is not intended to limit the scope of the invention to these particular embodiments.

FIG. 9 also illustrates the fundamental component of air-gap magnetic field resulting because of rotor poles.

DETAILED DESCRIPTION OF THE INVENTION

The present invention relates to an Integrated Starter Generator system. More particularly, the present invention relates to an Integrated Starter Generator system with an improved starting performance, improved generating performance, and being favourable for sensor-less operation.

Figure 1:
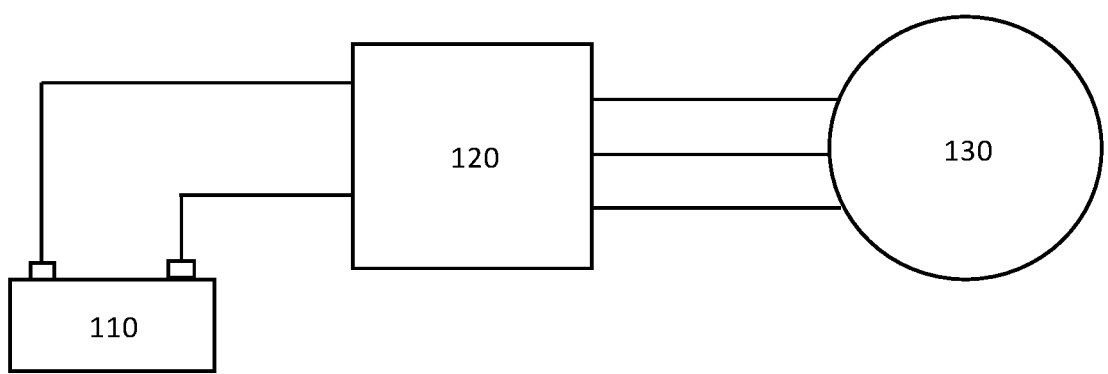
FIG. 1 illustrates a schematic view of an Integrated Starter Generator system, in accordance with an embodiment of the invention.

FIG. 1 illustrates a schematic representation of an Integrated Stater Generator system 100. As illustrated in the Figure, the Integrated Starter Generator system 100 comprises of a battery 110 having a nominal battery voltage and a three-phase brushless DC electric machine 130 powered by the battery 110. The Integrated Starter Generator (ISG) system 100 further comprises of an Electronic Control Unit 120 coupled to the battery 110 and the three-phase brushless DC electric machine 130. The Electronic Control Unit 120 is configured to apply commutations to the three-phase brushless DC electric machine 130 for a starter operation, and control the current generated by the three-phase brushless DC electric machine 130 for a generator operation through power switches.

Figure 2:
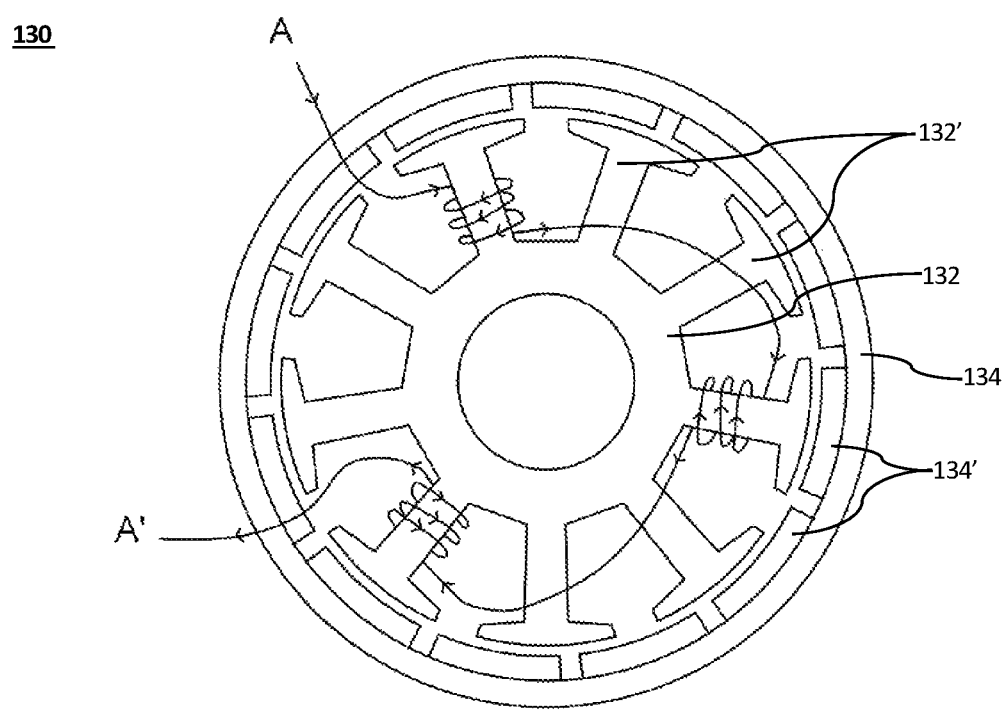
FIG. 2 illustrates a sectional view of a three-phase brushless DC electric machine with 9 stator teeth and 12 rotor poles, in accordance with an embodiment of the invention.

FIG. 2 illustrates a sectional view of the three-phase brushless DC electric machine 130 (hereinafter referred to as "electric machine"). The electric machine 130 has a stator 132 and a rotor 134. The stator 132 of the electric machine 130 has 3n stator teeth 132', where n is a natural number and each stator tooth 132' receives a coil corresponding to one of the phases of the electric machine 130. The rotor 134 of the electric machine 130 has 4n rotor poles 134' facing the stator 132, where, as mentioned earlier, n is a natural number. Magnets forming the rotor poles 134' are disposed in a manner that, the rotor poles 134' are arranged with an alternating sequence of magnet polarity facing the stator 132. For example, a rotor pole corresponding to a first polarity is disposed between two rotor poles corresponding to a second polarity and vice versa. In the ISG system 100 described hereinbefore, back-emf constant of the electric machine 130 is substantially between 25% of the nominal battery voltage and 75% of the nominal battery voltage, wherein back-emf constant is defined as amplitude of the line-to-line back-emf voltage when the electric machine 130 is rotated at a 1000 RPM. Further, it is well established that amplitude of back-emf voltage of a three-phase brushless DC electric machine varies linearly with rotating speed of the machine, and therefore, as the RPM of the electric machine 130 is increased, the back-emf constant will increase accordingly.

As mentioned earlier, each stator tooth 132' has a coil corresponding to one of the three phases. In an embodiment, each stator tooth 132' has a coil corresponding to one of the three phases and the coils are all wound in the same directional sense. In an embodiment, each stator tooth 132' has the coil corresponding to one of the three phases wound in an anticlockwise sense. In an alternative embodiment, each stator tooth 132' has the coil corresponding to one of the three phases wound in a clockwise sense.

In the stator 132 of the electric machine 130, teeth numbered 3k+1 are wound with the coil corresponding to a first phase, teeth numbered 3k+2 are wound with the coil corresponding to a second phase and teeth numbered 3k+3 are wound with the coil corresponding to a third phase, where k∈[0,n−1], that is 'k' spans the range of natural numbers between 0 to n−1, both 0 and n−1 included in the range. The coils are connected in suitable series and parallel combinations, with suitable number of turns in each coil, as per the requirement.

In the exemplary embodiment depicted in FIG. 2, n is equal to 3 with the stator 132 having 9 (nine) stator teeth 132' and the rotor 134 having 12 (twelve) rotor poles 134' facing the stator 132. As illustrated, teeth numbered 1, 4 and 7 are wound with a coil (A-A') corresponding to the first phase. Accordingly, teeth numbered 2, 5 and 8 are wound with the coil corresponding to the second phase and teeth numbered 3, 6 and 9 are wound with the coil corresponding to the third phase.

Figure 3:
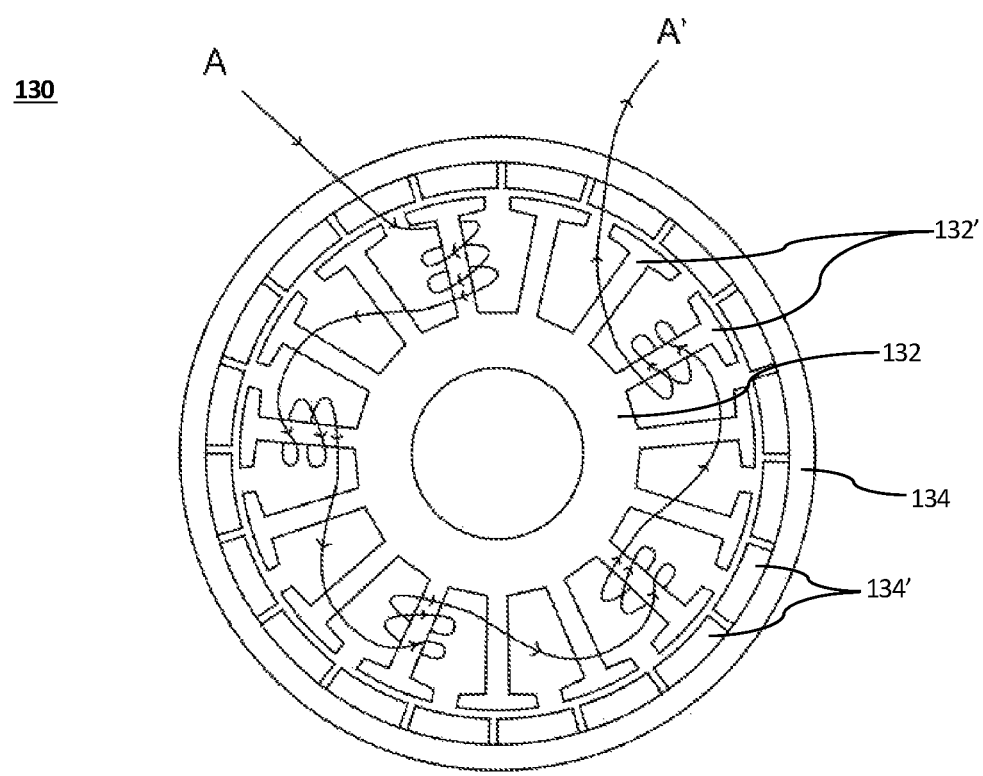
FIG. 3 illustrates a sectional view of a three-phase brushless DC electric machine 15 stator teeth and 20 rotor poles, in accordance with an embodiment of the invention.

In an alternative embodiment illustrated in FIG. 3, n is equal to 5 with the stator 132 having 15 (fifteen) stator teeth 132' and the rotor 134 having 20 (twenty) rotor poles 134' facing the stator 132. Teeth numbered 1, 4, 7, 10 and 13 are wound with the coil (A-A') corresponding to the first phase. Accordingly, teeth numbered 2, 5, 8, 11 and 14 are wound with the coil corresponding to the second phase and teeth numbered 3, 6, 9, 12 and 15 are wound with the coil corresponding to the third phase.

In a further alternative embodiment, n is equal to 4 with the stator 132 having 12 (twelve) stator teeth 132' and the rotor 134 having 16 (sixteen) rotor poles 134' facing the stator 132.

Figure 4A:
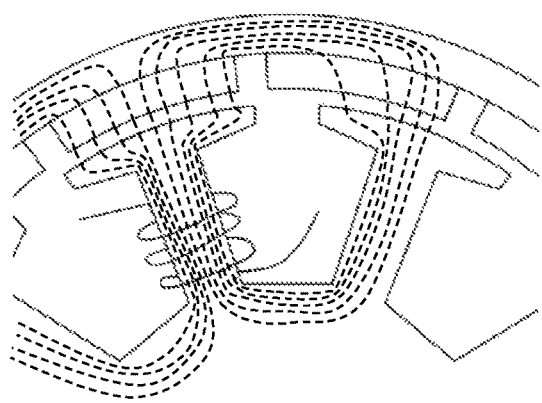
FIG. 4 illustrates comparative stator teeth magnetic saturation for electric machines with thick stator teeth, against electric machines with thin stator teeth, in accordance with an embodiment of the invention.
Figure 4B:
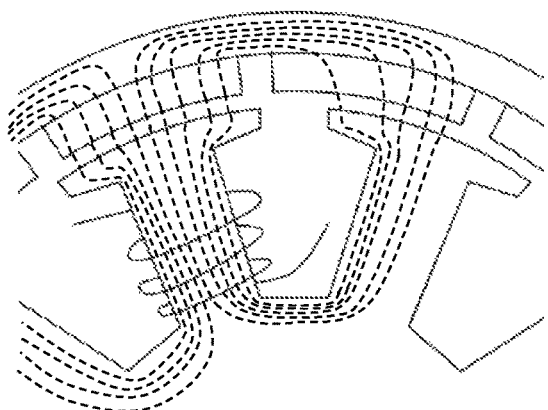

It is understood that typical sensor-less position estimation methods rely on inductance variation of stator phase windings as a function of rotor position with respect to the stator. The inductance variation is significant if magnetic saturation of stator teeth varies significantly with rotor position. The magnetic saturation of stator teeth as a function of rotor position can be increased by reducing the thickness of stator teeth, resulting in increase in the magnetic flux density in the stator teeth. FIG. 4b illustrates magnetic flux density in the machines known in the prior art while, FIG. 4a illustrates increased magnetic flux density in thinner stator teeth 132' of the present invention as compared to conventional thick stator teeth, wherein other features of the electric machines, such as number of winding turns per stator teeth, are kept the same. The increased magnetic flux density results in increase in stator winding inductance variation as a function of rotor position, therefore resulting in the electric machine 130 as per the present invention being favorable for sensor-less operation. In an embodiment, to obtain thinner stator teeth 132' and obtain increased magnetic flux density, average width of each stator teeth 132' is kept smaller than 1.2 times the diameter of the stator 132 divided by number of stator teeth 132'.

Figure 5:
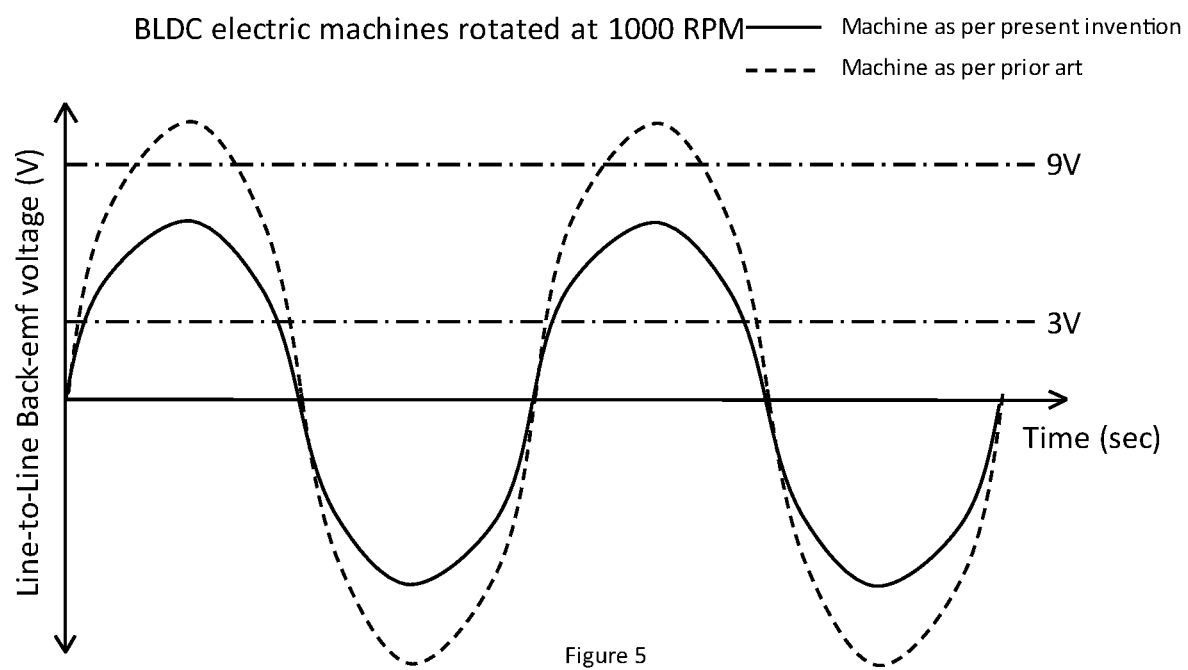
FIG. 5 illustrates comparative back-emf voltage waveform of electric machines with a high back-emf constant and a low back-emf constant, for ISG systems comprising battery with 12V nominal voltage, in accordance with an embodiment of the invention.

Reference is made to FIG. 5, wherein in an embodiment, the battery 110 of the ISG system 100 has a nominal voltage substantially between 10V to 14V. FIG. 5 illustrates line-to-line back-emf voltage waveforms of two electric machines being rotated at 1000 RPM in ISG systems with 12V nominal battery voltage. The waveform depicted by dotted line represents the electric machine having relatively high back-emf constant as used in conventional ISG systems, while the waveform depicted by solid line represents the electric machine 130 having relatively low back-emf constant in accordance with the present invention. As shown, the electric machine with high back-emf constant has amplitude of line-to-line back-emf greater than 9V, that is 75% of 12V. The electric machine 130 with low back-emf constant has amplitude of line-to-line back-emf voltage between 3V and 9V, that is between 25% and 75% of 12V.

Figure 6:
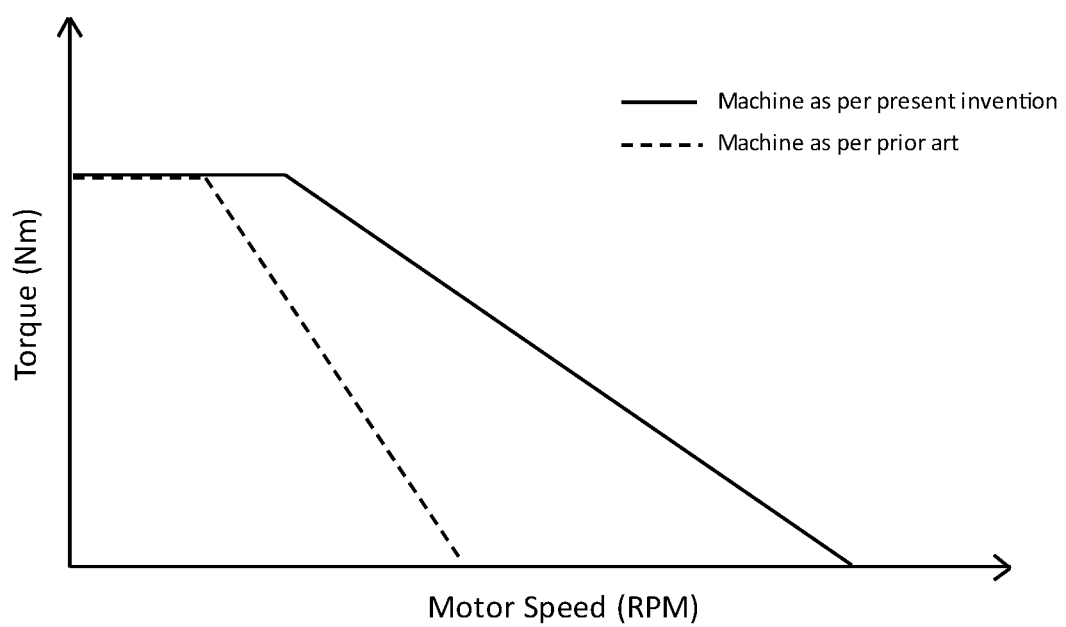
FIG. 6 illustrates comparative torque-vs-speed characteristics of electric machine with a high back-emf constant as per conventional ISG systems, against the electric machine with relatively low back-emf constant, in accordance with an embodiment of the invention.

As illustrated in FIG. 6, the electric machine 130 with low back-emf constant as per present invention can produce higher torque at higher machine speeds, compared to conventional electric machines with high back-emf constant. Torque producing capability of electric machines reduce as the difference between battery voltage and induced back-emf voltage reduces. For a given machine speed, the difference, between battery voltage and induced back-emf, is higher in the electric machine 130 with low back-emf constant, compared to electric machines with high back-emf constant. This results in higher torque producing capability of the electric machine 130 with low back-emf constant as per the present invention, especially as machine speed increases.

Figure 7:
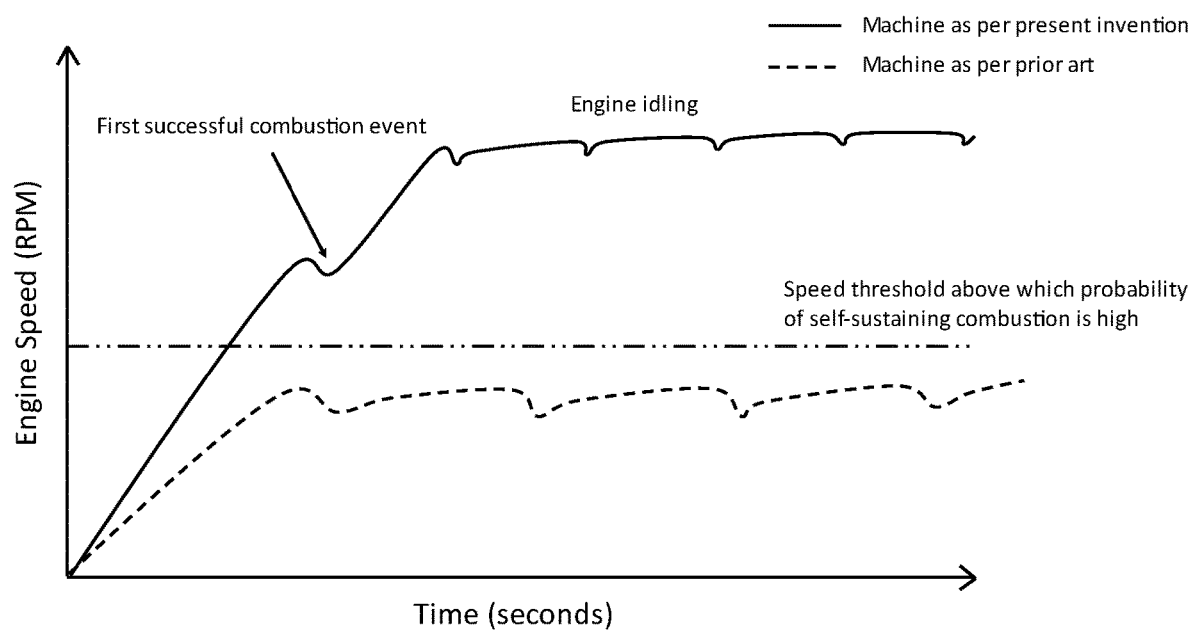
FIG. 7 illustrates comparative cranking speed during engine starting operation between electric machine with a high back-emf constant as per conventional ISG systems, against the electric machine with relatively low-back-emf constant, in accordance with an embodiment of the invention.

It is known that starting operation of IC engines requires the crankshaft of IC engine to be rotated at a reasonable speed. The probability of self-sustaining combustion, resulting in engine starting increases as the cranking speed of IC engine increases. FIG. 7 illustrates higher cranking speed achievement when using the electric machine 130 with low back-emf constant as per the present invention, as compared to lower cranking speed achievement when using conventional electric machines with high back-emf constant. This illustrates that the probability of engine starting in an ISG system is higher while using electric machine 130 with low back-emf constant as per the present invention.

Figure 8:
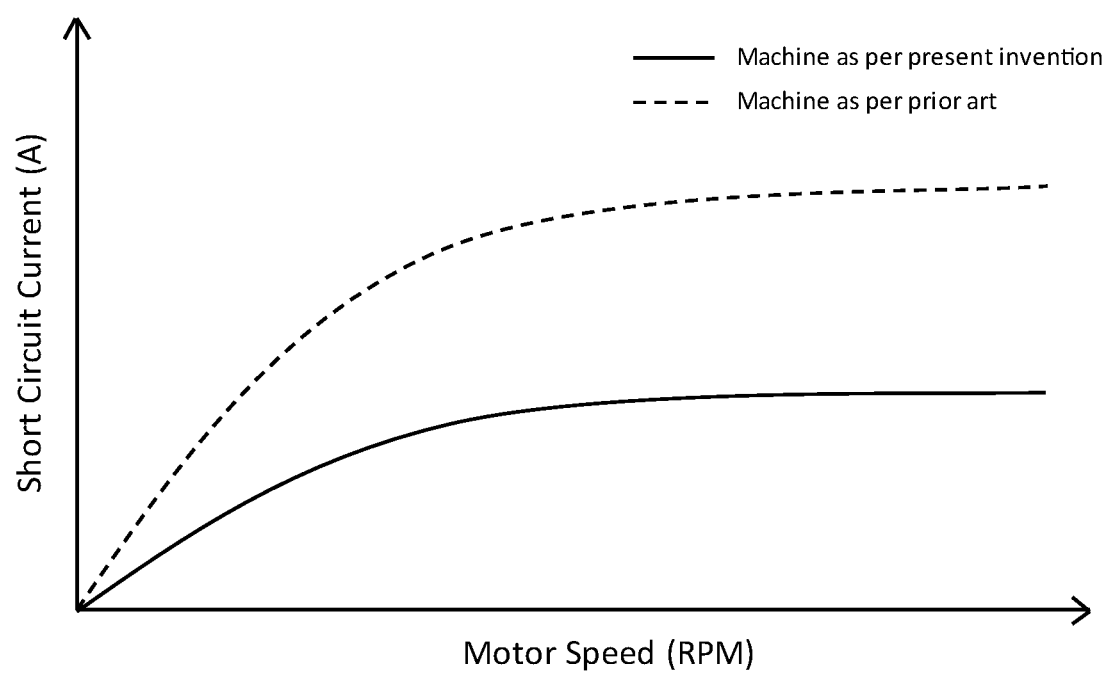
FIG. 8 illustrates comparative short-circuit current as a function of machine speed between electric machine with a low stator winding inductance as per conventional ISG systems, against electric machine with relatively high stator winding inductance, in accordance with an embodiment of the invention.

It is further known that short-circuit current of the electric machine is a good indicator of efficiency of an ISG system when the electric machine is acting as a generator. The efficiency of the system is higher if short-circuit current is lower. FIG. 8 illustrates a reduction in short-circuit current for the electric machine 130 in accordance with the present invention, in comparison to conventional electric machines used in ISG applications. Assuming substantially equal back-emf constant of two electric machines, the short-circuit current is lower for the electric machine 130 with higher stator winding inductance as per the present invention.

Figure 9:
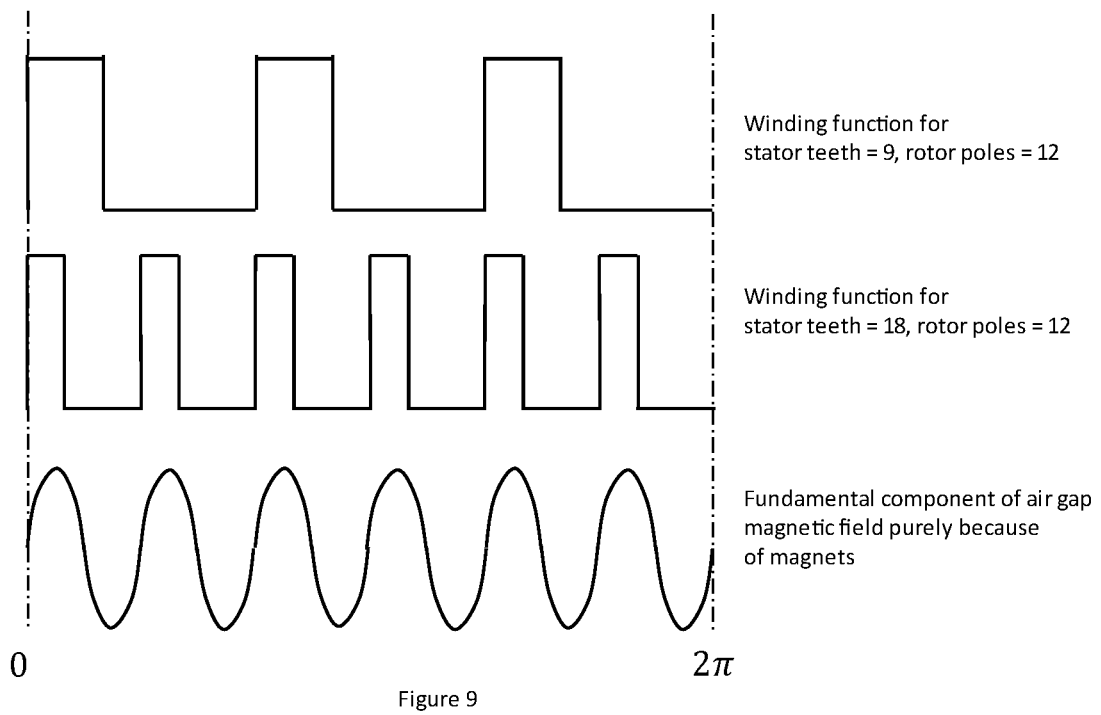
FIG. 9 illustrates comparative winding function between electric machine with 18 stator teeth, 12 rotor poles as per conventional ISG systems, against the electric machine with 9 stator teeth, 12 rotor poles in accordance with an embodiment of the present invention.

FIG. 9 illustrates winding function of a conventional electric machine with 18 (eighteen) stator teeth and 12 (twelve) rotor poles compared against winding function of the electric machine 130 with 9 (nine) stator teeth 132' and 12 (twelve) rotor poles 134' as illustrated in FIG. 2. FIG. 9 also illustrates fundamental component of magnetic field in air-gap. The flux linkage in stator winding is provided by the maximum value of $f=(\alpha)\int_0^{2\pi} N(\theta)B(\theta+\alpha)d\theta$, where $N(\theta)$ is the winding function, and $B(\theta)$ is the fundamental component of magnetic field. For the same number of winding turns per stator teeth, the electric machine with 18 (eighteen) stator teeth and 12 (twelve) rotor poles has twice the flux linkage compared to the electric machine 130 with 9 (nine) stator teeth 132' and 12 (twelve) rotor poles 134'. To achieve substantially equal flux linkage in the electric machine 130 as per the present invention to the conventional electric machine, and therefore achieving substantially equal back-emf constant, the number of turns in the electric machine 130 with 9 (nine) stator teeth 132' and 12 (twelve) rotor poles 134', should be twice the number of turns as in the electric machine with 18 (eighteen) stator teeth and 12 (twelve) rotor poles. Since inductance of machine varies quadratically with number of turns, the inductance of the electric machine 130 with 9 (nine) stator teeth 132' and 12 (twelve) rotor poles 134' will be significantly higher compared to the electric machine with 18 (eighteen) stator teeth and 12 (twelve) rotor poles for similar back-emf constant. This also applies to other embodiments of the electric machine 130 in accordance with present invention, such as the electric machine 130 with 15 (fifteen) stator teeth 132' and 20 (twenty) rotor poles 134' as illustrated in FIG. 3.

Advantageously, the present invention provides an ISG system with a three-phase brushless DC electric machine with increased magnetic flux density, resulting in increased stator winding inductance variation as a function of rotor position and rendering the electric machine favorable for sensor-less operation.

Further, the present invention provides the electric machine with low back-emf constant where the difference between battery voltage and induced back-emf is higher, resulting in higher torque producing capability of the ISG system in a starting operation. The electric machine of the ISG system of the present invention also achieves higher cranking speed.

Furthermore, the electric machine as per the present invention has a reduced short-circuit current due to increased stator winding inductance, thereby having an increased efficiency when the ISG system is acting as a generator. The reduced short circuit current also results in reduction of heat generation in the power switches of the Electronic Control Unit.

While the present invention has been described with respect to certain embodiments, it will be apparent to those skilled in the art that various changes and modification may be made without departing from the scope of the invention as defined in the following claims.

The invention claimed is:

1. An Integrated Starter Generator system (100), comprising:
- a battery (110); and
- an electric machine (130) having: a stator (132) with 3n stator teeth (132'), 'n' being a natural number, each stator tooth (132') having a coil corresponding to one of the three phases; and a rotor (134) with 4n rotor poles (134') facing the stator (132), magnets on the rotor poles (134') being disposed with an alternating sequence of magnet polarity facing the stator (132);
- wherein an average width of each stator teeth (132') is smaller than 1.2 times the diameter of the stator (132) divided by number of stator teeth (132'); and
- wherein a back-emf constant of the electric machine (130) is substantially between 25% of a nominal battery voltage and 75% of the nominal battery voltage.

2. The Integrated Stater Generator system (100) as claimed in claim 1, wherein each stator tooth (132') has a coil corresponding to one of the three phases wound in a same directional sense, wherein the teeth numbered 3k+1 are wound with the coil corresponding to a first phase, teeth numbered 3k+2 are wound with the coil corresponding to a second phase and teeth numbered 3k+3 are wound with the coil corresponding to a third phase, where k∈[0, n−1].

3. The Integrated Starter Generator system (100) as claimed in claim 1, wherein the battery (110) has the nominal battery voltage between 10V and 14V.

4. The Integrated Starter Generator system (100) as claimed in claim 1, wherein n=3 with the stator (132) having 9 stator teeth (132') and the rotor (134) having 12 rotor poles (134') facing the stator (132).

5. The Integrated Starter Generator system (100) as claimed in claim 1, wherein n=5 with the stator (132) having 15 stator teeth (132') and the rotor (134) having 20 rotor poles (134') facing the stator (132).

6. The Integrated Starter Generator system (100) as claimed in claim 1, wherein n=4 with the stator (132) having 12 stator teeth (132') and the rotor (134) having 16 rotor poles (134') facing the stator (132).

* * * * *